(12) United States Patent
Hegler

(10) Patent No.: US 6,939,503 B2
(45) Date of Patent: Sep. 6, 2005

(54) METHOD AND APPARATUS FOR THE MANUFACTURE OF PIPES OF THERMOPLASTICS WITH TRANSVERSE PROFILE FEATURES

(76) Inventor: Ralph Peter Hegler, Schillerstrasse 7, D-97688 Bad Kissingen (DE)

( * ) Notice: Subject to any disclaimer, the term of this patent is extended or adjusted under 35 U.S.C. 154(b) by 540 days.

(21) Appl. No.: 10/079,191

(22) Filed: Feb. 19, 2002

(65) Prior Publication Data

US 2002/0125609 A1 Sep. 12, 2002

(30) Foreign Application Priority Data

Mar. 7, 2001 (DE) .......................................... 101 10 775

(51) Int. Cl.[7] .............................................. B29C 43/22
(52) U.S. Cl. ....................... 264/506; 264/508; 425/336; 425/396; 425/190; 425/193; 425/183
(58) Field of Search ................................. 264/506, 508; 425/336, 396, 190, 193, 183

(56) References Cited

U.S. PATENT DOCUMENTS

| | | | | |
|---|---|---|---|---|
| 3,430,292 A | * | 3/1969 | Bauman et al. | ............. 425/183 |
| 5,017,321 A | * | 5/1991 | Comfort | ..................... 264/167 |
| 5,560,941 A | | 10/1996 | Hegler | |
| 5,693,347 A | | 12/1997 | Hegler | ....................... 425/233 |

FOREIGN PATENT DOCUMENTS

| | | |
|---|---|---|
| DE | 44 14 977 A1 | 2/1995 |
| DE | 199 46 571 C1 | 10/2000 |
| DE | 199 14 974 A1 | 12/2000 |
| DE | 200 11 668 U1 | 12/2000 |
| EP | 0 764 516 A2 | 11/1996 |
| EP | 0 636 462 B1 | 2/1997 |

* cited by examiner

Primary Examiner—Suzanne E. McDowell
(74) Attorney, Agent, or Firm—James Conte; Barnes & Thornburg LLP

(57) ABSTRACT

A method and an apparatus for the manufacture of pipes of thermoplastics with transverse profile features comprises mold segment halves which are circulated by twos on a molding path. A conveying device of the type of a gantry crane is provided for recirculation of the mold segment halves. On a conveying bridge that bridges the molding path, provision is made for two conveying carriages, which are movable in opposite directions and cross-wise of the direction of production and which have mounted on them a downward conveying arm with a holding device for a respective mold segment half. Provided downstream of the downstream end of the molding path are parking positions for additional mold segment halves, those of which that are closest to the molding path being carriages which are movable out of the path of displacement of the conveying arms.

9 Claims, 4 Drawing Sheets

US 6,939,503 B2

METHOD AND APPARATUS FOR THE MANUFACTURE OF PIPES OF THERMOPLASTICS WITH TRANSVERSE PROFILE FEATURES

BACKGROUND OF THE INVENTION

1. Field of the Invention

The invention relates to a method for the manufacture of pipes of thermo-plastics with transverse profile features, comprising mold segment halves which are circulated and, subsequent to an injection head, disposed in two lines opposite to each other, with the mold segment halves of a line not being interconnected, and which complement one another by twos along a straight molding path, forming a closed hollow mold; wherein each of the mold segment halves of a line is guided out of the molding path at the downstream end thereof and substantially at right angles to a direction of production by means of a conveying device and is re-circulated to the up-stream end of the molding path, where it is again inserted in the molding path and attached to the respective mold segment half that leads in the direction of production; wherein downstream of the downstream end of the molding path and on both sides thereof, an additional first mold segment half is kept in a first parking position for insertion in the molding path; the invention further relates to an apparatus for putting the method into practice.

2. Background Art

A method of the generic type and an apparatus of the generic type are known for example from U.S. Pat. No. 5,693,347.

In order to obtain a reliable connection of pipes that are provided with a socket at one end and with a spigot at the other end, a minimum length of the connecting socket is required. Practice and literature proceed from a so-called plug-in length i.e., a length by which the spigot is inserted into the socket. As a rule, the plug-in length must exceed the outside pipe diameter by 30 percent. If pipes of very great diameters are to be manufactured, this means that, given a single-piece design of the mold segment halves that serve for molding the socket, these mold segment halves and consequently all the mold segment halves will be very long, which is accompanied with some problems in terms of manufacturing. In particular, the mold segment halves will become very heavy, demanding for an enormous increase in the power required in the process, in particular the accelerating power. This applies especially to cases when the socket and spigot are molded directly one after the other during the continuous manufacture of the pipe, with an intermediate section being in between which has to be cut out subsequently.

When the apparatus is embodied in the way of a gantry crane, having a conveying carriage and conveying arms, as known from U.S. Pat. No. 5,693,347, the entire system is largely free from torque i.e., there are no tilting forces that have to be compensated by corresponding constructional measures. This known apparatus is applicable in particular where pipes of great diameters are to be produced, requiring very big and heavy mold segment halves.

EP 0 636 462 B1, U.S. DES. Pat. No. 199 46 571 C2 and U.S. DES. Pat. No. 200 11 668 U1 teach further apparatuses in which mold segment halves that serve for molding sockets can be added to, and removed from, the circulating mold segment halves. In all these cases—as with the apparatus of the generic type—it is only possible to mold a pipe section that deviates from a standard pipe, for instance a socket that can be molded by means of a pair of mold segment halves.

SUMMARY OF THE INVENTION

It is the object of the invention to embody a method of the species in such a way that optionally, greater pipe sections may be molded that deviate from a standard pipe and cannot be molded in a pair of mold segment halves; and to specify an apparatus for putting the method into practice.

According to the invention, this object is attained in a method of the species by the features wherein at least one additional mold segment half is kept in at least one additional parking position between the first parking positions for the first mold segment halves and the downstream end of the molding path, these additional mold segment halves also being insertable in the molding path.

The gist of the invention resides in that at least two pairs of mold segment halves can be inserted in the molding path directly one after the other and may again be removed and parked. They are used without hindering each other in the displacement.

An apparatus for putting the method into practice is characterized in that downstream of the downstream end of the molding path and on both sides thereof, provision is made for a first parking position for an additional first mold segment half that is approachable by the conveying device; and in that between the first parking positions for the first mold segment halves and the downstream end of the molding path, provision is made for at least one additional parking position for at least one further additional mold segment half that is also approachable by the conveying device. In this case too it is important for the conveying device to be able to approach any parking position without mold segment halves being in the way that are closer to the molding path.

When the conveying device is designed in the way of a gantry crane, then there is no need for the mold segment halves to be lifted one above the other; they may be led past one another.

Further features, advantages and details of the invention will become apparent from the ensuing description of an exemplary embodiment, taken in conjunction with the drawing.

DESCRIPTION OF THE PREFERRED EMBODIMENT

Figure 1:
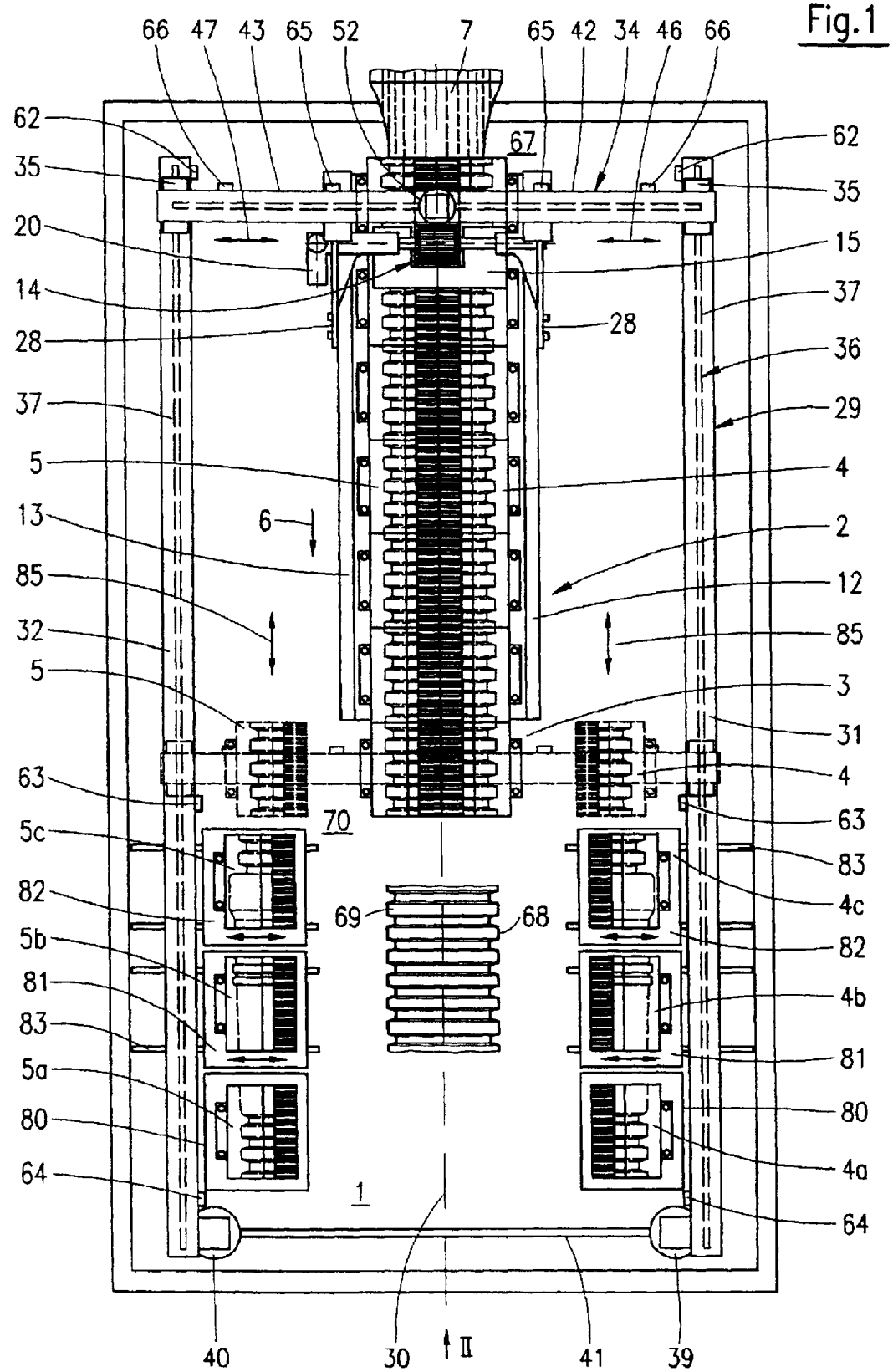
FIG. 1 is a plan view of an apparatus for the manufacture of pipes.
Figure 2:
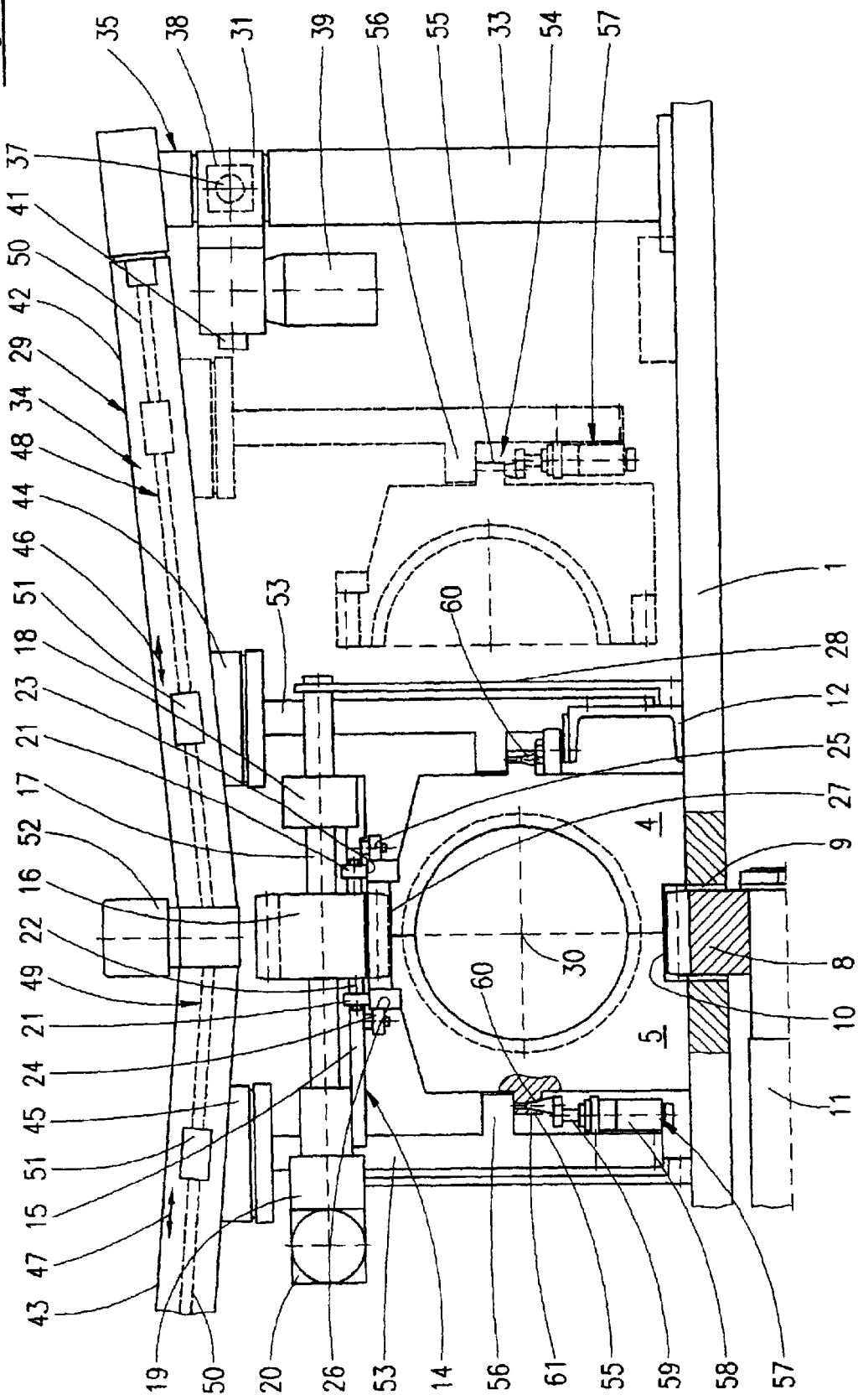
FIG. 2 is an elevation, partially broken open, of the apparatus in accordance with the arrow II of FIG. 1.

FIGS. 1 and 2 illustrate an apparatus for the manufacture of pipes of thermoplastics having transverse profile features. This apparatus has a base 1 with a molding path 2 situated on it. On this molding path 2, mold segments 3 are lined up, each consisting of two mold segment halves 4, 5. As long as the mold segment halves 4, 5 are joined together by twos, forming a mold segment 3, and as long as adjacent mold segments 3 are joined together, forming a mold, they move in a straight line corresponding to a direction of production 6 on the base 1. For the continuous drive of the mold formed by the mold segments 3, a lower driving pinion 8 is provided right behind an extrusion head 7 of an extruder, the pinion 8 reaching through a recess 9 in the base 1 and engaging with an indentation 10 formed on the respective lower side of the mold segment halves 4, 5. The lower driving pinion 8 is non-rotatably mounted on a drive shaft 11 which is located underneath the base 1 and driven by a gear motor (not shown). The mold segment halves 4, 5 are guided and kept together on the molding path 2 by guide rails 12, 13 which engage with such portion of the mold segment halves 4, 5 that is adjacent to the base 1.

A counterpart bearing 14 is provided above the base 1 and above the mold. It has a base plate 15 on which is supported an upper driving pinion 16. This upper driving pinion 16 is likewise non-rotatably mounted on a drive shaft 17, both ends of which are run in bearings 18, 19 which are fastened to the base plate 15. The drive shaft 17 is driven by a gear motor 20 which is attached to the adjacent bearing 19. Supporting rollers 21 are located on the lower side of the base plate 15, having a horizontal axis of rotation 22 and supporting themselves on supporting surfaces 23 formed on the upper side of each mold segment half 4, 5, which defines the position of the counterpart bearing 14 relative to the mold segment halves 4. Guide rollers 24 are positioned on the lower side of the base plate 15, having a vertical axis of rotation 25 and engaging laterally with guide surfaces 26 that are also formed on the upper side of the mold segment halves 4, 5. By means of these guide rollers 24, two mold segment halves 4, 5 that constitute a mold segment 3 are guided and held together by their upper portion. Between the supporting surfaces 23 and the guide surfaces 26, respectively, the upper driving pinion 16 engages with an indentation 27, which is formed on the upper sides of the mold segment halves 4, 5. Only one third to one quarter of the amount of advance exercised on the mold segments 3 by the lower driving pinion 8 is transmitted to the mold segments 3 by the upper driving pinion 16. The counterpart bearing 14 is supported in torque converter bearings 28, which are mounted on the base 1 and stand vertically upright thereon and which absorb the torque exercised by the gear motor 20 on the counterpart bearing 14. The counterpart bearing 14 itself rests on the supporting surfaces 23 substantially by its own weight. This weight is sufficient to compensate the forces that occur where the upper driving pinion 16 engages with the indentation 27 and act vertically upwards on the counterpart bearing 14.

A conveying device 29 for the mold segment halves 4, 5 is provided above the base plate 1. This conveying device 29 is designed in the way of a gantry crane. It has two guide rails 31, 32 extending parallel to each other and parallel to the direction of conveyance 6, to the central longitudinal axis 30 of the mold segments 3 and to the base 1. These guide rails 31, 32 are disposed above the counterpart bearing 14 and supported relative to the base 1 by props 33. A conveying bridge 34 is supported on the guide rails 31, 32 by bogie wagons 35. Displacement of the conveying bridge 34 on the guide rails 31, 32 takes place by means of linear drives 36, which are spindle drives in the concrete embodiment. Consequently, these linear drives 36 have threaded spindles 37, which are disposed on the guide rails 31, 32 and on which are disposed threaded nuts 38 which are again fixed to the bogie wagons 35. The threaded spindles 37 are driven each by a gear motor 39, 40, these two gear motors 39, 40 being forcibly synchronized by way of a horizontal coupling shaft 41 that extends at right angles to the guide rails 31, 32. These two threaded spindles 37 are driven precisely at the same speed so that the conveying bridge 34 is displaced free from tilting on the guide rails 31, 32. The conveying bridge 34 has two bridge sections 42, 43, which, seen from the guide rails 31, 32, run toward each other, inclining toward the base 1. Consequently, the lowest distance of the bridge 34 from the base 1 is in the middle of the bridge 34 vertically above the central longitudinal axis 30. A conveying carriage 44, 45 is displaceably disposed on each of the two bridge sections 42, 43 and is movable in the respective direction of displacement 46 or 47 by means of a linear drive 48 or 49. These linear drives 48, 49 substantially consist of a threaded spindle 50 that is housed in the respective bridge section 42 or 43 and engages with a threaded nut 51 on the respective conveying carriage 44 or 45. The two threaded spindles 50 are driven by a common gear motor 52. The gear motors 39, 40 and the gear motor 52 are reversible motors, i.e. they are suitable for advance and reverse motion.

A conveying arm 53, which extends vertically downwards, is attached to each conveying carriage 44, 45. Each conveying arm 53 is provided with a holding device 54 for a mold segment half 4 and 5, respectively. Allocated to the holding device 54, a holding abutment 55 is formed on each mold segment half 4 and 5, respectively. Each holding device 54 has an upper stop 56 which a holding abutment 55 is pressed against from below. Further, a clamping device 57, which substantially consists of a pneumatic or hydraulic piston-cylinder drive 58, belongs to the holding device 54. A locking pin 60 is formed on the piston rod 59 of this drive 58, which, upon corresponding actuation of the drive 58, engages with a locking recess 61 on the lower side of the holding abutment 55, simultaneously pressing the abutment 55 against the stop 56. In the position shown on the left of FIG. 2, the holding device 54 and the holding abutment 55 of the adjacent mold segment half 4 or 5 are tightly interlocked; consequently, the latter is tightly united with the conveying arm 53.

Proximity switches—only some, 62 63, of which are shown—are disposed on the guide rails 31, 32 and, upon approach of the conveying bridge 34, transmit signals reflecting the position thereof to a central control unit (not shown). Proximity switches 65, 66 are also provided on the conveying bridge 34, transmitting signals to the central control unit that reflect an inner or outer position of the respective conveying carriage 44, 45.

Two tubes of thermally plastic material are extruded from the extrusion head 7 of the extruder, entering the mold at the upstream end 67 of the molding path 2 where they are molded, by means of overpressure or vacuum and, if necessary, support air, into a twin-wall pipe 68 which has a smooth inside wall and an outer corrugation 69, as known in detail from U.S. Pat. No. 5,320,797 which reference is made to. By alternative, it is also possible to mold single-piece corrugated pipes or ribbed pipes.

The mold consisting of the mold segments 3 advances in the direction of production 6. The pipe 68 produced therein migrates at the same rate. When a mold segment 3 has reached the downstream end 70 of the molding path 2, the two mold segment halves 4, 5 that constitute this mold segment 3 must be removed from the molding path 2 crosswise of the direction of production 6. As shown by dot-dashed lines in FIGS. 1 and 2—this is done by the transverse conveying means formed by the conveying carriages 44, 45 with conveying arms 53. During the last short distance covered by the—in the direction of production 6—last mold segment 3, the conveying bridge 34 is run along therewith at the same rate, the two conveying carriages 44, 45 being moved into a position in which they adjoin each other. In this position, the holding devices 54 and the holding abutments 55 of the two mold segment halves 4, 5 have been interlocked. When reaching the downstream end 70, the two conveying carriages 44, 45 are moved apart upon a corresponding signal of the proximity switches 63, to which end the gear motor 52 is correspondingly triggered. Owing to the inclination of the two bridge sections 42, 43, the mold segment halves 4, 5 held by the conveying arms 53 are lifted off the base 1 and moved out-wards without friction. When the conveying carriages 44 reach the outer proximity switches 66, they are stopped. The gear motors 39, 40 are triggered so that the conveying bridge 34 is moved counter to the direction of production 6 as far as to the upstream end 67 of the molding path 2. Also during their transport counter to the direction of production 6, the mold segment halves 4, 5 do not contact the base 1, but are frictionless there-above. They are always moved parallel to themselves.

When the upstream proximity switches 62 are reached, the gear motors 39, 40 are stopped so that the conveying bridge 34 is at a standstill. The gear motor 52 is switched on, moving the conveying carriages 44, 45 inwards toward the molding path and, at the upstream end 67, leading the two mold segment halves 4, 5 crosswise of the direction of production 6 into the molding path 2, as shown by solid lines in FIGS. 1 and 2. Upon displacement of the conveying carriages 44, 45 toward the molding path 2, owing to the inclination of the bridge sections 42, 43, the mold segment halves 4, 5 are again lowered toward the base 1, on which they rest when the two mold segment halves 4, 5 of a mold segment 3 contact, as seen in FIG. 2. Then the conveying bridge 34 is moved in the direction of production 6 until the two mold segment halves 4, 5 that already form a mold segment 3 bear against the mold segment halves 4, 5 that lead in the direction of production 6 and are seized and moved on by the driving pinions 8 and 16. Then the clamping devices 57 are released and the conveying arms 53 are again moved outwards away from the molding path. The conveying bridge 34 is then again displaced as far as to the downstream end 70, as described above. As far as described hereinbefore, the apparatus is known from U.S. Pat. No. 5,693,347 A.

The apparatus for the manufacture of pipes 68 as described hereinbefore may also employ additional mold segment halves 4a, 5a, 4b, 5b, 4c, 5c that constitute additional mold segments for instance when sockets 71 of great length are to be produced at given intervals in the continuous pipe 68, these sockets 71 comprising a socket bottom 72, an intermediate area 73 and an inlet area 74. The inlet area 74 is followed by a transition area 75 that must be cut out and that is followed by a spigot 76. This portion that extends from the socket bottom 72 to the spigot 76 is to be molded in-line. As mentioned at the outset, the invention primarily relates to the production of pipes of major diameter; the diameters seen in the drawing are too small relative to the respective length. The in-line molding of sockets as such within a pair of mold segment halves is known for instance from U.S. Pat. No. 5,320,797 which reference is made to as far a molding technology is involved.

Related to the direction of production 6, the additional mold segment halves 4a, 5a, 4b, 5b, 4c, 5c are downstream of the downstream end 70 of the molding path 2 in parking positions 77, 78, 79 on the base plate 1. The conveying bridge 34 may be moved into these parking positions 77, 78, 79. The parking position 77 is formed by a setting 80 on the base 1, the height of which above the base 1 results from the inclination of the bridge sections 42, 43. The setting 80 is sufficiently high for the respective mold segment half 4a or 5a to rest thereon in the associated position of the conveying arms 53 that carry it.

Figure 3:
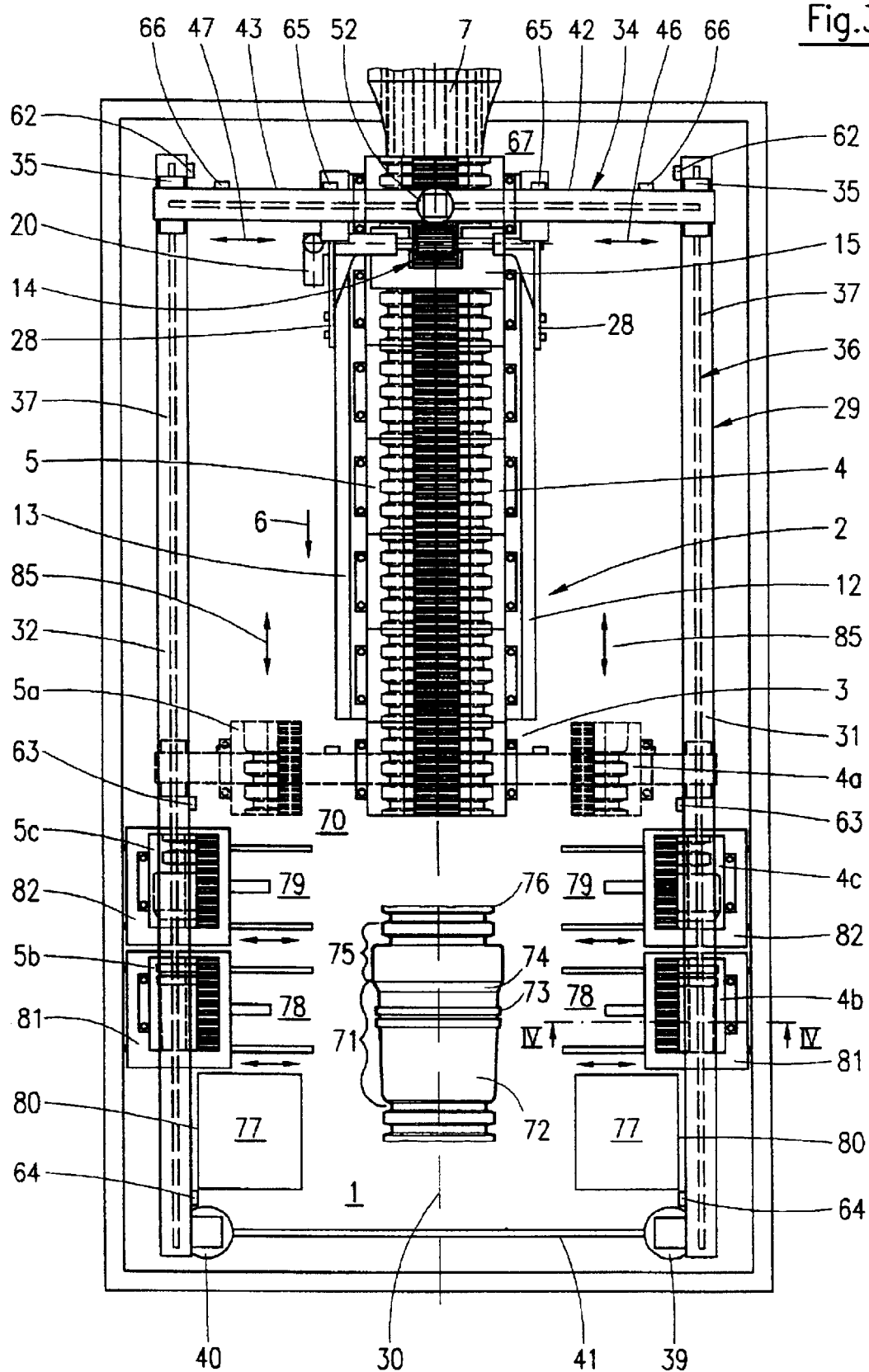
FIG. 3 is a plan view of the apparatus in a position of operation that deviates from FIG. 1.
Figure 4:
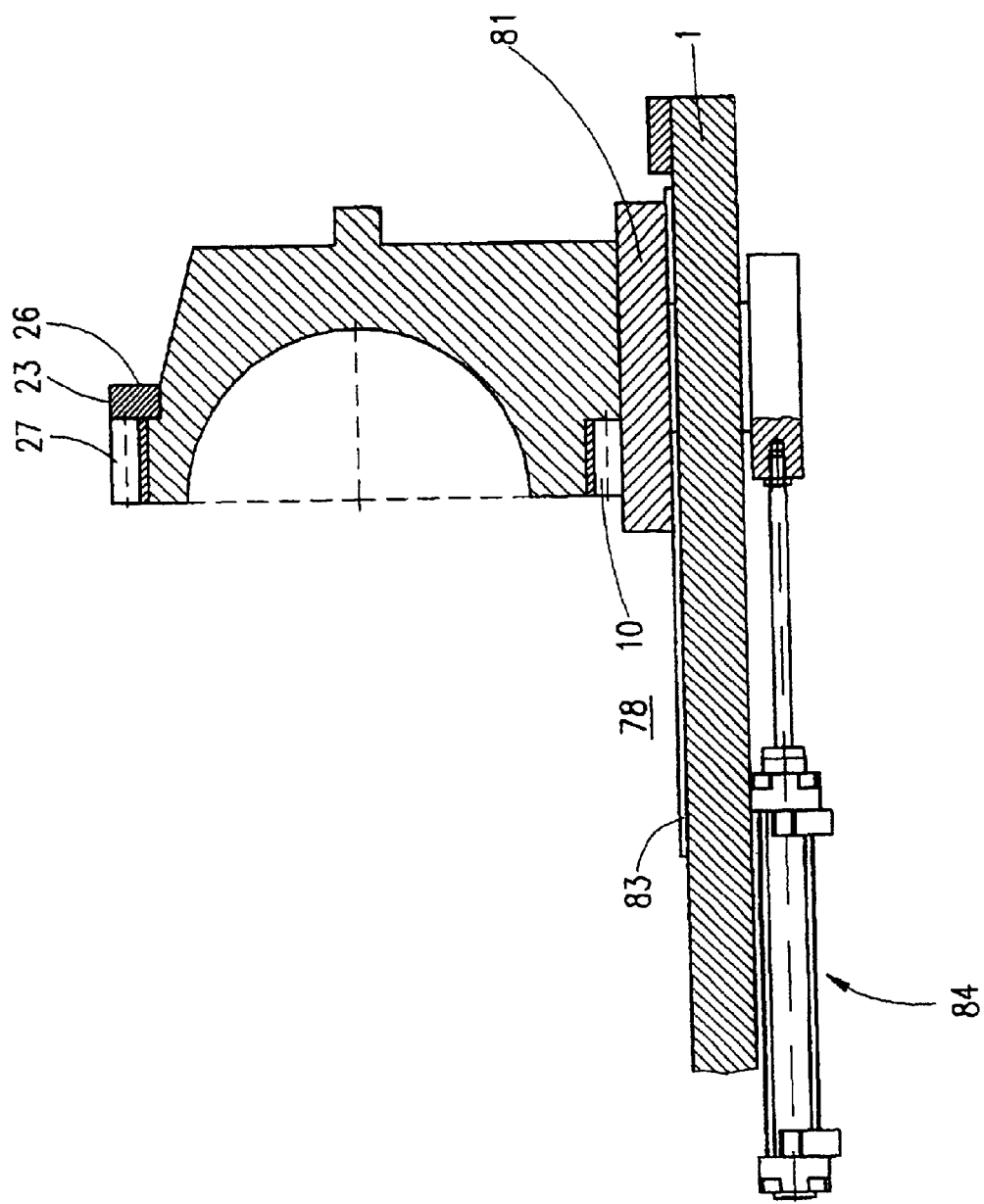
FIG. 4 is a partial cross-sectional view through the apparatus on the line IV—IV of FIG. 3.

The two other parking positions 78, 79 that are further upstream are formed by carriages 81, 82 which are displaceable on rails 83 crosswise of the direction of production 6 on the base 1. Linear drives 84 serve for displacement; they may be pneumatically or hydraulically actuated piston-cylinder drives. The carriages 81, 82 are movable between a position of rest seen in FIG. 2 and a position of access seen in FIG. 1. In the position of rest, the carriages 81 that carry the mold segment halves 4b, 5b and the carriages 82 that carry the mold segment halves 4c, 5c are moved sufficiently far out of the path of displacement 85 of the conveying arms 53 for the mold segment halves 4a, 5a not to collide with them, as illustrated in FIG. 3. The same applies to the displacement of the mold segment halves 4b, 5b when they have to be conveyed past the mold segment halves 4c and 5c. As regards the height of the carriages 81, 82, the same applies as for the settings 80. While the mold segment halves 4a, 5a that are in the parking position 77 on the settings 80 may stay in the path of displacement of the conveying arms 53 because they are the mold segment halves farthest downstream, the mold segment halves 4b, 5b and 4c, 5c must be moved into the position of rest after being placed on the carriage 81 and 82; they are again moved into the position of access according to FIG. 1 right before being lifted by the conveying arms 53.

Allocated to the parking positions 77, 78, 79 are proximity switches on the guide rails 31, 32, with only the proximity switches 64 being shown. When the additional mold segment halves 4a, 5a are to be employed that serve for molding the socket bottom 72, then the conveying bridge 34 is moved until it reaches the parking position 77 and interlocking of the additional mold segment halves 4a, 5a and the conveying arms 53 of the conveying carriages 44, 45 takes place, as shown by dot-dashed lines in FIG. 3. Then the conveying operation takes place counter to the direction of production 6 in the manner described, until the two additional mold segment halves 4a, 5a can be inserted in the molding path 2 at the upstream end 67. Afterwards the mold segment halves 4b, 5b and then the mold segment halves 4c, 5c are lifted by twos in the same way and transported to the upstream end 67 and inserted in the molding path 2. All of them are removed from the molding path in the manner described at the downstream end 70 and moved into their respective parking position 77 and 78 and 79. The mold segment halves 4b, 5b kept in the parking position 78 substantially serve to mold part of the socket bottom 72 and of the intermediate area 73 of the socket 71, whereas the mold segment halves 4c, 5c substantially serve to mold the inlet area 74 and the transition area 75.

As known from U.S. Pat. No. 5,693,347, pipes 68 of varying diameters may be produced on the apparatus. In the case of minor pipe diameters, the continuous pipe 68 section that is composed of the socket 71, transition area 75 and spigot 76 may be so short that only two additional mold segment halves are necessary for molding.

What is claim is:

1. A method for the manufacture of pipes of thermoplastics with transverse profile features, comprising mold segment halves (4, 5) which are circulated and, subsequent to an extrusion head (7), disposed in two lines opposite to each other, with the mold segment halves (4, 5) of a line not being interconnected, and which complement one another by twos along a straight molding path (2), forming a closed hollow mold;

wherein each of the mold segment halves (4, 5) of a line is guided out of the molding path (2) at the downstream end (70) thereof and substantially at right angles to a direction of production (6) by means of a conveying device (29) and is re-circulated to the upstream end (67) of the molding path (2), where it is again inserted in the molding path (2) and attached to the respective mold segment half (4, 5) that leads in the direction of production (6);

wherein downstream of the downstream end (70) of the molding path (2) and on both sides thereof, an additional first mold segment half (4a, 5a) is kept in a first parking position (77) for insertion in the molding path (2);

wherein at least one additional mold segment half (4b, 5b, 4c, 5c) is kept in at least one additional parking position (78, 79) between the first parking positions (77) for the first mold segment halves (4a, 5a) and the downstream end (70) of the molding path (2), these additional mold segment halves (4b, 5b, 4c, 5c) also being insertable in the molding path (2)

wherein at least one further additional mold segment half (4b, 5b, 4c, 5c) is moved out of a path of displacement (85) of the first mold segment halves (4a, 5a), when the first mold segment halves (4a, 5a) are moved from their first parking position (77) toward the molding path (2); and wherein at the least further additional mold segment half (4b, 5b, 4c, 5c) is moved out of the path of displacement (85) of the first mold segment halves (4a, 5a), when the first mold segment halves (4a, 5a) are moved from the molding path (2) into the first parking position (77).

2. A method, according to claim 1, for the manufacture of pipes with in-line molded sockets (71), wherein the first mold segment halves (4a, 5a) and the further additional mold segment halves (4b, 5b, 4c, 5c) are inserted directly successively in the molding path (2) for molding a socket (71) on the pipe (68).

3. An apparatus for the manufacture of pipes of thermoplastics with transverse profile features, comprising mold segment halves (4, 5) which are circulated and, subsequent to an injection head (7), disposed in two lines opposite to each other, with the mold segment halves (4, 5) of a line not being interconnected, and which complement one another by twos along a straight molding path (2), forming a closed hollow mold;

wherein each of the mold segment halves (4, 5) of a line is guided out of the molding path (2) at the downstream end (70) thereof and substantially at right angles to a direction of production (6) by means of a conveying device (29) and is re-circulated to the upstream end (67) of the molding path (2), where it is again inserted in the molding path (2) and attached to the respective mold segment half (4, 5) that leads in the direction of production (6);

wherein downstream of the downstream end (70) of the molding path (2) and on both sides thereof, provision is made for a first parking position (77) for an additional first mold segment half (4a, 5a) that is approachable by the conveying device (29);

wherein, between the first parking positions (77) for the first mold segment halves (4a, 5a) and the downstream end (70) of the molding path (2), provision is made for at least one additional parking position (78, 79) for at least one further additional mold segment half (4b, 5b, 4c, 5c) that is also approachable by the conveying device (29); and wherein the at least one further additional mold segment half (4b, 5b, 4c, 5c) is provided for removal from a path of displacement (85) of the respective first mold segment half (4a, 5a).

4. An apparatus according to claim 3, wherein the at least one further parking position (78, 79) comprises carriages (81, 82) for lodgment of the further additional mold segment halves (4b, 5b, 4c, 5c).

5. An apparatus according to claim 4, wherein the carriages (81, 82) are movable on rails (83).

6. An apparatus according to claim 4, wherein the carriages (81, 82) are movable by linear drives (84).

7. An apparatus according to claim 3, wherein the conveying device (29) is in the form of a gantry crane, comprising a conveying bridge (34) that is displaceable in the direction of production (6) and bridges the molding path (2);

two conveying carriages (44, 45) that are disposed on the conveying bridge (34) and displaceable in opposite directions and crosswise of the direction of production (6); and a conveying arm (53) on each conveying carriage (44, 45), the conveying arm (53) being directed downwards toward the base (1) and having a holding device (54) for a respective mold segment half (4, 5).

8. An apparatus according to claim 3, wherein the first parking positions (77) are stationary relative to the base (1).

9. An apparatus according to claim 3, wherein the parking positions (77, 78, 79) are raised as compared to the base (1).

* * * * *